United States Patent [19]
Couper

[11] Patent Number: 5,383,695
[45] Date of Patent: Jan. 24, 1995

[54] DEVICE FOR SECURING A HOOK TO A LINE

[76] Inventor: John R. Couper, 533 E. Fourth, #8, Loveland, Colo. 80537

[21] Appl. No.: 195,684

[22] Filed: Feb. 16, 1994

Related U.S. Application Data

[63] Continuation-in-part of Ser. No. 10,427, Jul. 6, 1993.

[51] Int. Cl.⁶ ............................................. D03J 3/00
[52] U.S. Cl. ................................................... 289/17
[58] Field of Search ................... 289/2, 16, 17, 18.1; 223/99; D8/349, 382

[56] References Cited

U.S. PATENT DOCUMENTS

| | | |
|---|---|---|
| 3,625,556 | 12/1971 | Stromberg .............................. 289/17 |
| 3,712,651 | 1/1973 | Shockley ................................ 289/17 |
| 4,029,346 | 6/1977 | Browning . | 
| 4,188,052 | 2/1980 | Browning . |
| 5,236,232 | 8/1993 | Broberg ................................ 289/17 |

FOREIGN PATENT DOCUMENTS

| | | | |
|---|---|---|---|
| 260323 | 2/1963 | Australia ............................... | 289/17 |
| 2167931 | 6/1986 | United Kingdom .................. | 289/17 |

*Primary Examiner*—Clifford D. Crowder
*Assistant Examiner*—Michael A. Neas
*Attorney, Agent, or Firm*—Joseph J. Kelly

[57] ABSTRACT

A device for use in securing a hook having an eyelet to a line wherein the eyelet is held in alignment with openings in at least one end portions of first and second members pivotally connected for parallel movement in spaced apart parallel planes so that the end portion of the line may be passed through the aligned openings and the eyelet and secured to another portion of the line not passed through the aligned openings and the eyelet.

20 Claims, 1 Drawing Sheet

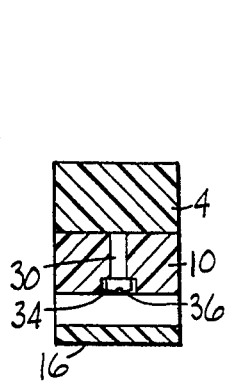
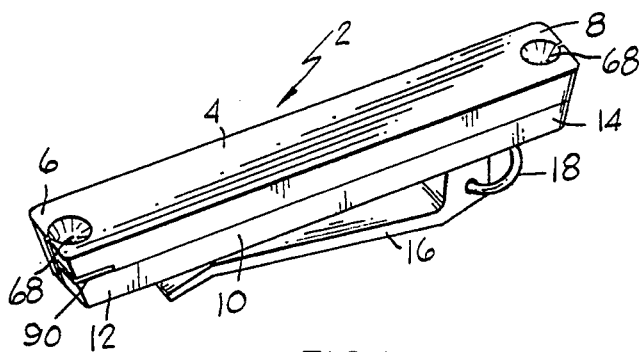
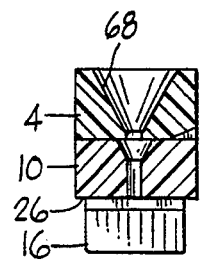
FIG.6   FIG.1   FIG.2
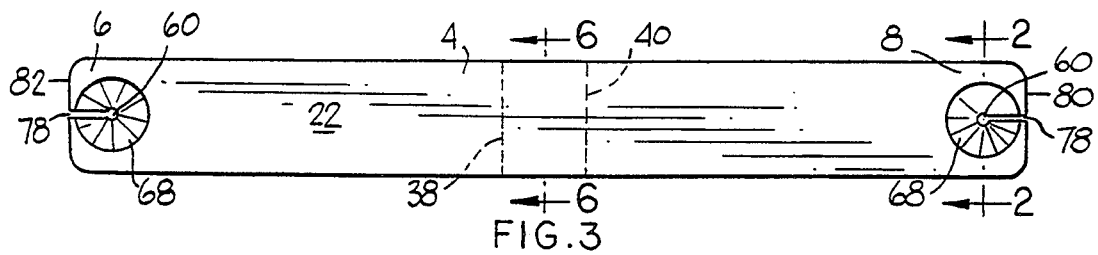
FIG.3
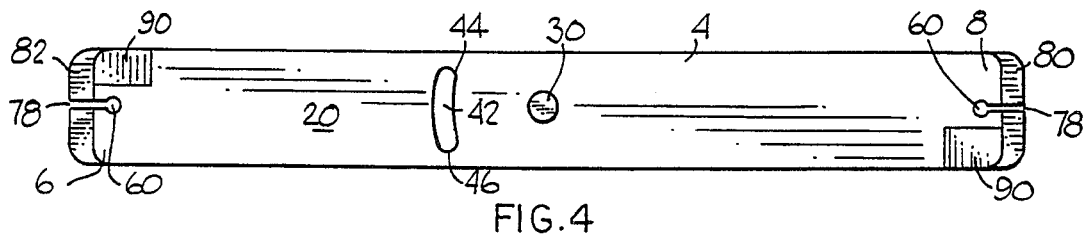
FIG.4
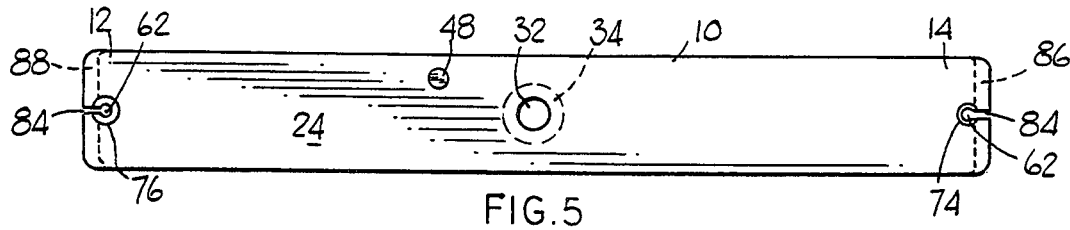
FIG.5
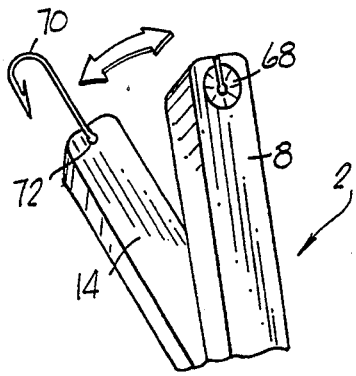
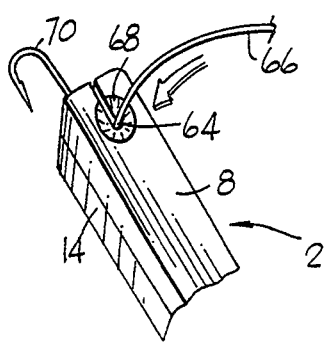
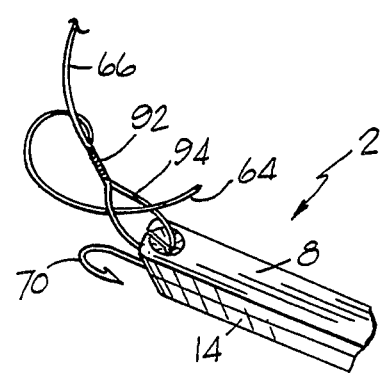
FIG.7   FIG.8   FIG.9

DEVICE FOR SECURING A HOOK TO A LINE

This application is a continuation in-part of U.S. patent application Ser. No. 29/010,427 filed Jul. 6, 1993 for Quick Tye of John R. Couper.

FIELD OF THE INVENTION

This invention relates generally to threading a line through an eyelet and more particularly to the threading of a fishing line through the eyelet of a fishing hook.

BACKGROUND OF THE INVENTION

A problem that is encountered by a fishing person is the threading of a fishing line through the eyelet of a fishing hook. In the past, there have been attempts to provide devices that can be used to guide the fishing line through an eyelet of a fishing hook. U.S. Pat. Nos. 4,029,346 and 4,188,052 to Browning describe devices for use in guiding a fishing line though a fishing hook. Applicant does not know whether or not the Browning devices have been successfully marketed and became aware of the Browning patent through a purchaser of his device. Therefore, there appears to be a need for a device that can be used easily by a fishing person to guide a fishing line through the eyelet of a fishing hook and to tie the fishing line to the fishing hook.

BRIEF DESCRIPTION OF THE INVENTION

This invention provides a device for securing a hook having an eyelet to a line and is particularly directed to securing a fishing hook having an eyelet to a fishing line.

In a preferred embodiment of the invention, the device comprises a first member having at least one end portion and a second member having at least one end portion. Pivot means are provided for connecting the first and second members for relative pivotal movement in spaced apart parallel planes between a first location at which the at least one end portions are in superposed relationship and a second location at which the at least one end portions are in an arcuately spaced apart relationship. Line receiving means are provided in each of the at least one end portions so that the line receiving means are in alignment when the at least one end portions are at the first location. Line removal means are provided in each of the at least one end portions so that the portion of the line in the line receiving means may be removed therefrom. Holding means are provided for holding an eyelet of a hook in alignment with the line receiving means when the at least one end portions are at the first location. Each of the at least one end portions has an opening passing therethrough to form the line receiving means. Each of the at least one end portions has an end surface and a slot formed therein for providing a passageway between the opening and the end surface to form the line removal means. Guide means are provided in the first member for guiding an end portion of a line into the opening in the at least one end portion of the first member so that a portion of the line may be passed through the openings in the at least one end portions and the eyelet. Stop means are provided for limiting the relative pivotal movement of the first and second members.

Each of the first and second members has an inner surface and an opposite outer surface. Guide means are provided in the first member and comprise a generally conical surface extending from the outer surface to the opening in the at least one end portion of the first member. The pivot means comprise a second opening in the second member extending between the inner and outer surfaces and a post projecting from the inner surface of the first member and passing through the second opening. The stop means comprise an arcuate recess having opposite end surfaces formed in the inner surface of the first member and a post projecting from the inner surface of the second member and having at least a portion thereof located in the arcuate recess. The holding means comprise a conical recess formed in the inner surface of the second member in alignment with the opening in the first member and a planar portion of the inner surface of the first member superposed over the recess. The end surfaces of the fist and second members taper inwardly from the outer surface of the first member to the outer surface of the second member to provide finger room for holding the fishing hook while moving the first and second members from the second location to the first location.

In the embodiment of the invention described in this application, the device for use in securing a hook having an eyelet to a line comprises a first member having first and second end portions and a second member having first and second end portions. Pivot means are provided for connecting the first and second members for relative pivotal movement in spaced apart parallel planes between a first location at which the first and second end portions are in a superposed relationship and a second location at which the first and second end portions are in an arcuately spaced apart relationship. Line receiving means are provided in each of the first and second end portions so that the line receiving means in the first end portions and in the second end portions are in alignment when the first and second end portions are at the first location. Line removal means are provided in each of the first and second end portions so that the portion of the line in the line receiving means may be removed therefrom. Holding means are provided for holding an eyelet of a hook in alignment with the line receiving means in one of the first end portions and the second end portions when the first and second end portions are at the first location. The line receiving means, the line removal means and the guide means in the first and second end portions are the same as those described above in relation to the at least one end portions. Also, the pivot means and the stop means are the same as those described above. It is understood that either the first or second end portions could be designed for purposes other than securing a fishing line to a fishing hook, such as scissors for cutting the fishing line or a tool for cleaning the openings and the eyelet.

BRIEF DESCRIPTION OF THE DRAWINGS

An illustrative and presently preferred embodiment of the invention is shown in the accompanying drawing in which:

FIG. 1 is a perspective view of the device of this invention;

FIG. 2 is a cross-sectional view taken on the line 2—2 of FIG. 3;

FIG. 3 is a top plan view of the first member of the device of this invention;

FIG. 4 is a bottom plan view of the first member of this invention;

FIG. 5 is a top plan view of the second member of this invention;

FIG. 6 is a cross-sectional view taken on the line 6—6 of FIG. 3; and

FIGS. 7-9 are perspective views illustrating the use of the invention.

DETAILED DESCRIPTION OF THE INVENTION

In FIGS. 1-5, there is illustrated a preferred embodiment of a device 2 for use in securing a hook, preferably a fishing hook, having an eyelet to a line, preferably a fishing line. The device 2 comprises a first member 4 having first and second end portions 6 and 8 and a second member 10 having first and second end portions 12 and 14. A clip 16 is secured to the second member 10 so that the device 2 can be retained in a shirt pocket or a belt. A ring 18 is provided so that the device 2 may be carried on a ring or hung on a hook. The first and second members 4 and 10 are preferably formed from a relatively rigid plastic material such as a high impact styrene or other materials having similar characteristics.

The first member 4 has an inner surface 20, FIG. 4, and an opposite outer surface 22, FIG. 3. The second member 10 has an inner surface 24, FIG. 5, and an opposite outer surface 26, FIG. 2. Pivot means are provided for connecting the first and second members 4 and 10 to provide for relative pivotal movement between a first location, FIGS. 1, 8 and 9, at which the first end portions 6 and 12 and the second end portions 8 and 14 are in a superposed relationship and a second location, FIG. 7, at which the first end portions 6 and 12 and the second end portions 8 and 14 are in an arcuately spaced apart relationship.

The pivot means are illustrated in FIGS. 4-6 and comprise a post 30 projecting outwardly from the inner surface 20 and an opening 32 extending through the second member 10. A recess 34 in the outer surface 26 surrounds the opening 32. The post 30 originally has a length greater than the thickness of the second member 10. After the post 30 has been inserted through the opening 32 and the inner surfaces 20 and 24 have been moved into a contacting relationship, heat is applied to the end of the post 30 to form a flange portion 36 to hold the inner surfaces 20 and 24 of the first and second member 4 and 10 in a contacting relationship but permitting relative pivotal movement therebetween. Although the inner surfaces 20 and 24 are in contacting relationship, the relative pivotal movement is in spaced apart parallel planes. The embodiment of the invention illustrated in FIGS. 1-6 provides for a wide range of sizes of fishing hooks. The first end portions 6 and 12 would be used for larger fishing hooks, such as 8 and 7, while the second end portions 8 and 14 would be used with smaller fishing hooks, such as 10-22. However, it is understood that it is within the scope of the invention to terminate the first and second members 4 and 10 at either of the dashed lines 38 and 40, FIG. 3, and have one device 2 extending between the first end portion 6 and the dashed line 40 and another device 2 extending between the second end portion 8 and the dashed line 38. Also, other fishing accessories, such as scissors or cleaning tools may be designed to be substituted for the end portions 6 and 12.

Stop means are provided for limited the pivotal movement of the first end portions 6 and 12 and the second end portions 8 and 14. The stop means comprise an arcuate recess 42 having opposite end portions 44 and 46 in the inner surface 20 and a post 48 projecting outwardly from the inner surface 24. When the inner surfaces 20 and 24 are in a contacting relationship, the post 48 is located in the arcuate recess 42 and limits the pivotal movement of the first and second members 4 and 10 by contacting either the end portion 44 or the end portion 46.

Line receiving means are provided at each of the first end portions 6 and 12 and the second end portions 8 and 14. The line receiving means will be explained in relation to the second end portions 8 and 14 and the same reference numerals will be applied for corresponding parts of the first end portions 8 and 12. The line receiving means comprise an opening 60 in the second end portion 8 and an opening 62 in the second end portion 14. As illustrated in FIGS. 2 and 3, the openings 60 and 62 are in alignment when the second end portions 8 and 14 are in a superposed relationship. Guide means are provided for guiding an end portion 64, FIG. 8, of a fishing line 66 into the opening 60 and comprise a conical recess 68 in the outer surface 22 of the second end portion 8 and leading into the opening 60. Holding means are provided for holding a fishing hook 70 having an eyelet 72 so that the fishing hook 70 can be secured on the fishing line 66. A portion of the holding means comprises a conical recess 74 in the upper surface 24 of the second end portion 14. A larger conical recess 76 is formed in the upper surface 24 of the first end portion 12 to provide for larger fishing hooks 70. Each conical recess 74 and 76 can receive different sizes of eyelets 72. Line removal means are provided and comprise a slot 78 in the second member 8 and extending between the opening 60 and the conical recess 68 and the end surface 80 of the second end portion 8. A similar slot 84 in the second end portion 14 extends between the opening 62 and conical recess 74 or 76 and the end surface 86 of the second end portion 14.

Means are provided for accommodating the end portions of fingers holding a fishing hook during the securing operation for securing a fishing hook 70 on a fishing line 66, described below and comprise an inclined recess 90 in the inner surface 20 of the first and second end portions 6 and 8. Also, the end surfaces 80 and 86 and 82 and 88 are tapered inwardly from the outer surface 22 to the outer surface 26 at an angle of between about 20 and 30 degrees.

The operation of the device 2 is illustrated in FIGS. 7-9. The first and second members 4 and 10 are pivoted so that the second end portions 8 and 14 are moved to the second location so that they are arcuately spaced apart as illustrated in FIG. 7. A fishing hook 70 is held by the thumb and forefinger of a user and the eyelet 72 is placed in the conical recess 74 and the first and second members 4 and 10 are pivoted until the second end portions 8 and 14 are in a superposed relationship as illustrated in FIG. 8. A portion of the inner surface 20 of the second end portion 8 covers the conical recess 74 to prevent rotation of the eyelet 72. The fishing line end portion 64 is inserted into the conical recess 68 and is guided to the opening 60 and is moved through the opening 60, the eyelet 72 and the opening 62. About 5 to 6 inches of the line are pulled through the opening 60, the eyelet 72 and the opening 62. The middle portion of the 5 to 6 inch portion and another portion of the line 66 are held together and the device 2 is rotated 4 or 5 times to form the twisted portion 92. The end portion 64 is then passed through the loop 94 and moved toward the center of outer surface 22. While holding the end portion 64 in place, a force is applied to the line 66 to move the twisted portion 66 toward the second end portion 8.

As this movement is continued, the portions of the line 66 in the openings 60 and 62 move through the slots 78 and 84. The first and second members 4 and 10 are then pivoted to the second location, and the fishing hook 70 secured to the end portion 64 is removed.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A device for use in securing a hook having an eyelet to a line comprising:
    a first member having at least one end portion;
    a second member having at least one end portion;
    pivot means for connecting said first and second members for relative pivotal movement in spaced apart parallel planes between a first location at which said at least one end portions are in superposed relationship and a second location at which said at least one end portions are in an arcuately spaced apart relationship;
    line receiving means in each of said at least one end portions so that said line receiving means are in alignment when said at least one end portions are at said first location;
    line removal means in each of said at least one end portions so that the portion of the line in said line receiving means may be removed therefrom; and
    holding means for holding an eyelet of a hook in alignment with said line receiving means when said at least one end portions are at said first location.

2. A device as in claim 1 wherein:
    each of said at least one end portions having an opening passing therethrough to form said line receiving means;
    each of said at least one end portions having an end surface; and
    each of said at least one end portions having a slot formed therein for providing a passageway between said opening and said end surface to form said line removal means.

3. A device as in claim 2 and further comprising:
    guide means in said first member for guiding an end portion of a line into said opening in said at least one end portion of said first member so that a portion of said line may be passed through said openings in said at least one end portions and said eyelet.

4. A device as in claim 2 and further comprising:
    stop means for limiting said relative pivotal movement of said first and second members.

5. A device as in claim 1 and further comprising:
    said first member having an inner surface and an opposite outer surface;
    said second member having an inner surface and an opposite outer surface; and
    said inner surfaces being in a contacting relationship.

6. A device as in claim 5 and further comprising:
    guide means in said first member comprising a generally conical surface extending from said outer surface to said opening in said at least one end portion of said first member.

7. A device as in claim 5 and further comprising:
    said first and second members having end surfaces which taper inwardly from said outer surface of said first member to said outer surface of said second member.

8. A device as in claim 5 wherein said pivot means comprise:
    said second member having a second opening extending between said inner and outer surfaces; and
    a post projecting from said inner surface of said first member and passing through said second opening.

9. A device as in claim 5 and further comprising:
    stop means for limiting said relative pivotal movement of said first and second members.

10. A device as in claim 9 wherein said stop means comprise:
    said inner surface of said first member having an arcuate recess formed therein;
    said arcuate recess having opposite end surfaces; and
    a post projecting from said inner surface of said second member and having at least a portion thereof located in said arcuate recess.

11. A device as in claim 5 wherein said holding means comprise:
    said second member having a conical recess formed in said inner surface in alignment with said opening; and
    a planar portion of said inner surface of said first member superposed over said recess.

12. A device as in claim 11 and further comprising:
    stop means for limiting said relative pivotal movement of said first and second members comprising:
    said inner surface of said first member having an arcuate recess formed therein;
    said arcuate recess having opposite end surfaces; and
    a post projecting from said inner surface of said second member and having at least a portion thereof located in said arcuate recess;
    wherein said pivot means comprise:
        said second member having a second opening extending between said inner and outer surfaces; and
        a post projecting from said inner surface of said first member and passing through said second opening.

13. A device as in claim 5 and further comprising:
    said first and second members having end surfaces which taper inwardly from said outer surface of said first member to said outer surface of said second member.

14. A device for use in securing a hook having an eyelet to a line comprising:
    a first member having first and second end portions;
    a second member having first and second end portions;
    pivot means for connecting said first and second members for relative pivotal movement in spaced apart parallel planes between a first location at which said first and second end portions are in a superposed relationship and a second location at which said first and second end portions are in an arcuately spaced apart relationship;
    line receiving means in each of said first and second end portions so that said line receiving means in said first end portions and in said second end portions are in alignment when said first and second end portions are at said first location;
    line removal means in each of said first and second end portions so that the portion of said line in said line receiving means may be removed therefrom; and holding means for holding an eyelet of a hook in alignment with said line receiving means in one of said first end portions and said second end portions when said first and second end portions are at said first location.

15. A device as in claim 14 wherein:

each of said first and second end portions having an opening passing therethrough to form said line receiving means;

each of said first and second end portions having an end surface;

each of said first and second end portions having a slot formed therein for providing a passageway between said opening and said end surface to form said line removal means.

16. A device as in claim 15 and further comprising:

guide means in said first member for guiding an end portion of a line into said opening in one of said first and second end portions so that a portion of said line may be passed through one of said openings in said first end members and said second end members.

17. A device as in claim 15 and further comprising:

stop means for limiting said relative pivotal movement of said first and second members.

18. A device as in claim 14 and further comprising:

said first and second members having opposite end surfaces each of which tapers inwardly from said outer surface of said first member to said outer surface of said second member.

19. A device as in claim 18 and further comprising:

said first member having an inner surface and an opposite outer surface;

said second member having an inner surface and an opposite outer surface; and said inner surfaces being in a contacting relationship.

20. A device as in claim 18 and further comprising:

stop means for limiting said relative pivotal movement of said first and second members; and guide means in said first member for guiding an end portion of a line into said opening in one of said first and second end portions so that a portion of said line may be passed through one of said openings in said first end members and said second end members;

and wherein said pivot means comprise:

said second member having a second opening extending between said inner and outer surfaces; and a post projecting from said inner surface of said first member and passing through said second opening;

said stop means comprise:

said inner surface of said first member having an arcuate recess formed therein;

said arcuate recess having opposite end surfaces; and a post projecting from said inner surface of said second member and having at least a portion thereof located in said arcuate recess;

said holding means comprise:

said second member having a conical recess formed in said inner surface in alignment with said opening in one of said first and second end portions; and a planar portion of said inner surface of said first member superposed over said recess.

* * * * *